July 22, 1969
3,456,510
BARTOLOMEU CAPELO DA FONSECA FRANCO FRAZÃO
AUTOMATIC TEMPERATURE COMPENSATION SYSTEM FOR HORIZONTAL
FLOATER TYPE LIQUID DENSIMETERS
Filed Oct. 24, 1967
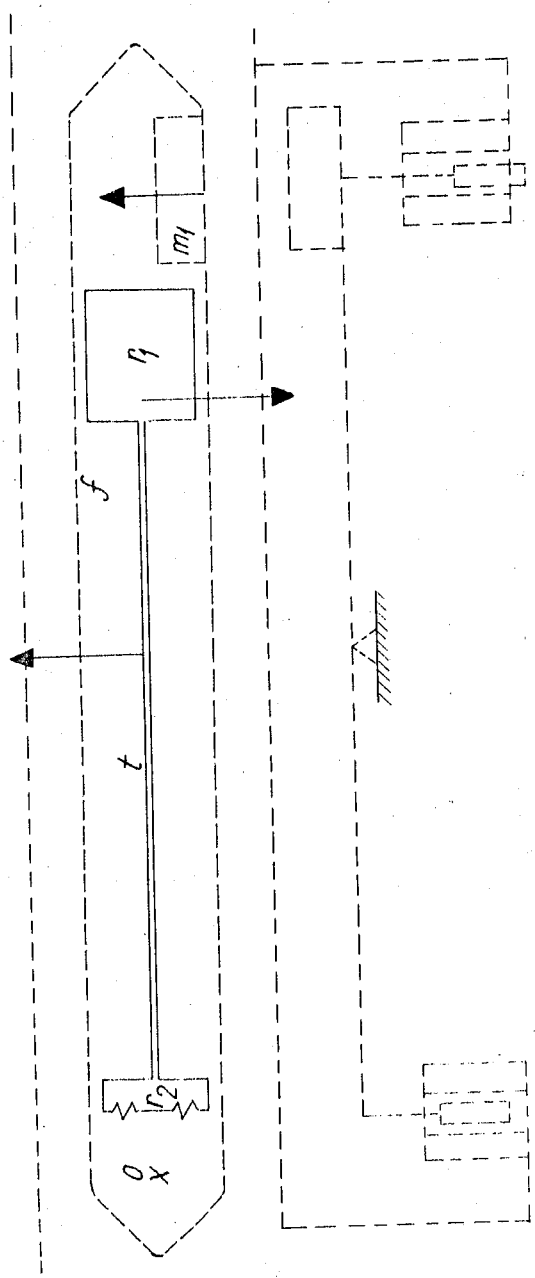
BARTOLOMEU CAPELO DA FONSECA FRANCO FRAZÃO,
*Inventor*
By Wenderoth, Lind
and Ponack.    *Attorneys*

United States Patent Office 3,456,510
Patented July 22, 1969

3,456,510
AUTOMATIC TEMPERATURE COMPENSATION SYSTEM FOR HORIZONTAL FLOATER TYPE LIQUID DENSIMETERS
Bartolomeu Capelo da Fonseca Franco Frazão, Lisbon Portugal, assignor to Companhia Uniao Fabril, S.A.R.L., Lisbon, Portugal
Filed Oct. 24, 1967, Ser. No. 677,611
Claims priority, application Portugal, Oct. 29, 1966, 46,649
Int. Cl. G01n 9/20
U.S. Cl. 73—452   2 Claims

ABSTRACT OF THE DISCLOSURE

The automatic temperature compensation is accomplished by providing a float having two spaced chambers therein containing a liquid. One chamber is provided with rigid walls while the other chamber is provided with a flexible wall. The two chambers are connected by a relatively long and narrow conduit.

---

The invention relates to devices for continuous liquid density measurement and is particularly applicable to devices of the kind described in my co-pending application Ser. No. 522,960 now Patent No. 3,385,114 in which there is afloat arranged to float in the liquid of which the density is to be measured, the float being pivoted to be rotatable about a horizontal axis displaced from the centre of buoyance thereof. In particular the invention relates to means for compensating for temperature changes which affect the density of the liquid so that the density of the liquid at a predetermined reference temperature may be determined.

According to the invention there is provided a device for continuous liquid density measurement comprising a vessel through which the liquid is passed, a float and means for mounting the float in the vessel to pivot about a horizontal axis displaced horizontally from the centre of buoyancy of the float. There is a first chamber in the float with rigid walls and a second chamber in the float with at least one flexible wall. The second chamber is disposed horizontally on the pivot side of the first chamber and the two chambers are coupled together and filled with liquid. Means are provided for determining the effective weight torque of the float about the pivot when the liquid to be measured is in the vessel, the arrangement being such that changes in temperature cause the centre of gravity of the float to shift and thereby compensate for changes in the density of the liquid.

An object of the invention is to provide two chambers which are separate and are coupled together by a relatively long and narrow conduit.

With the above and other objects in view which will become apparent from the detailed description below, a preferred embodiment of the invention is shown in the drawing wherein the figure is a schematic side elevation of the float.

Referring to the drawing the float is designated generally at $f$ and is immersed in operation in the liquid of which the density is to be measured. In operation the float assumes a horizontal position and is pivotally mounted about a horizontal axis at O. Tendencies for the float to pivot about its axis as a result of changes in the density of the liquid are detected and counterbalanced in a force-balance system of the kind described in co-pending application Ser. No. 522,960. One integer of the force-balance system is a magnet $m_1$ mounted at the end of the float remote from the pivot axis.

The float includes a chamber $r_1$ with rigid walls and a chamber $r_2$ spaced from the chamber $r_1$ on the pivot axis side thereof and having its end wall constituted by a flexible diaphragm. The two chambers are coupled by a relatively long and narrow conduit $t$. The two chambers and the conduit are filled with a liquid having a coefficient of thermal expansion which is chosen in conjunction with the other parameters of the system so that compensation is effected against changes in temperature.

The working principle of the device is to obtain a correspondence between the position of the centre of gravity of the liquid within the float and the temperature of the liquid, in such a way that the changes in the buoyancy torque due to fluctuations of the liquid density caused by the changes in its temperature are compensated by the changes in the float weight torque. The torque balance equation is:

$$(P \times a) = (I \times b) + (M \times c)$$

where P, I and M are respectively the actual weight acting downwardly; buoyancy from the liquid and magnetic repulsion. $a$, $b$ and $c$ are respectively the arms corresponding to each of these forces. Also, where V is the float volume and $d$ the density of the liquid we get:

$$I = V \times d \tag{1}$$

Thus:

$$(P \times a) = (V \times d \times b) + (M \times c) \tag{2}$$

In order that M does not change with the fluctuations of the density $\Delta d$ (caused by changes in the liquid temperature) and, in this manner, does not change the feedback current of the force-balance system (that is to say, does not change the output signal of the device), the float centre of gravity must suffer a displacement $\Delta a$ given by the equation:

$$P \times \Delta a = V \times b \times \Delta d \tag{3}$$

On the other hand we have:

$$\Delta d = K \Delta T \tag{4}$$

where K is the variation coefficient of density with the temperature. From (3) and (4) we get:

$$P \times \Delta a = V \times b \times K \times \Delta T \tag{5}$$

Thus, the device output signal does not change with temperature fluctuations $\Delta T$ if, simultaneously, the centre of gravity of the float is displaced by $\Delta a$ according to the Equation 5, which is the basic equation of the temperature compensation arrangement.

When the surrounding temperature changes the quantity $\Delta T$, the liquid within the float should thus change the quantity $\Delta v$, in such a way that:

$$P \times \Delta a = -l \times \Delta v \times \mu \tag{6}$$

where $l$ is the distance between chambers (approximately constant) and $\mu$ is the density of the liquid filling the system. As we have, on the other hand:

$$\Delta v = K_1 \times \Delta T \times v_0 \tag{7}$$

where $v_0$ is the initial volume of the interior liquid and $K_1$ its relative variation coefficient of volume with the temperature, we get from (5), (6) and (7):

$$l \times \mu \times K_1 \times v_0 = V \times b \times K \tag{8}$$

This equation shows that it is possible to obtain a temperature compensation adjusting $v_0$ or $l$, when $\mu$ and $K_1$ are fixed by the choice of the interior liquid of the system.

What I claim is:
1. A float for the continuous liquid density measurement in a vessel through which the liquid is passed comprising means for mounting the float in the vessel to pivot about a horizontal axis displaced horizontally from the center of buoyancy of the float, a first chamber in the float with rigid walls, a second chamber in the float with at least one flexible wall, the second chamber being disposed horizontally on the pivot side of the first chamber, said two chambers being coupled together and filled with liquid, said two chambers being spaced from one another a distance depending on the value of the coefficient of variation of density with temperature of said liquid in the interval of temperatures where compensation is effected whereby changes in temperature cause the center of gravity of the float to shift and thereby compensate for a change in the density of the liquid.

2. A float as claimed in claim 1 wherein said two chamber are coupled together by a relatively long and narrow conduit.

No References Cited.

RICHARD C. QUEISSER, Primary Examiner

J. K. LUNSFORD, Assistant Examiner

U.S. Cl. X.R.

73—435, 454